United States Patent
Enomura et al.

(10) Patent No.: US 11,161,079 B2
(45) Date of Patent: Nov. 2, 2021

(54) FILTRATION MEMBRANE MODULE AND FILTRATION PROCESSING METHOD

(71) Applicant: M. TECHNIQUE CO., LTD., Izumi (JP)

(72) Inventors: Masakazu Enomura, Izumi (JP); Mai Yoshizumi, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 16/624,687

(22) PCT Filed: Jun. 21, 2018

(86) PCT No.: PCT/JP2018/023641
§ 371 (c)(1),
(2) Date: Dec. 19, 2019

(87) PCT Pub. No.: WO2018/235901
PCT Pub. Date: Dec. 27, 2018

(65) Prior Publication Data
US 2020/0108350 A1    Apr. 9, 2020

(30) Foreign Application Priority Data

Jun. 21, 2017    (WO) .................. PCT/JP2017/022919

(51) Int. Cl.
*B01D 63/06*    (2006.01)
*B01D 65/02*    (2006.01)
*B01D 65/08*    (2006.01)

(52) U.S. Cl.
CPC ......... *B01D 63/065* (2013.01); *B01D 63/063* (2013.01); *B01D 63/066* (2013.01);
(Continued)

(58) Field of Classification Search
CPC .... B01D 63/063; B01D 63/065; B01D 65/02; B01D 65/08; B01D 2313/08; B01D 2321/2016
See application file for complete search history.

(56) References Cited

U.S. PATENT DOCUMENTS 3,754,658 A * 8/1973 Messing .................. D21F 1/66
    210/304
3,922,220 A    11/1975 Middleman et al.
(Continued)

FOREIGN PATENT DOCUMENTS

CN    105833569 A    8/2016
EP    2 586 520 A1    5/2013
(Continued)

OTHER PUBLICATIONS

Tsuge, Hideo et al—JP 53-142383 Machine Translation—1978 (Year: 1978).*
(Continued)

*Primary Examiner* — Bradley R Spies
(74) *Attorney, Agent, or Firm* — Birch, Stewart, Kolasch & Birch, LLP

(57) ABSTRACT

The purpose of this invention is to provide a filtration membrane module with which is possible to improve the centrifugal separation effect of the primary-side flowpath during filtration, and the centrifugal separation effect of the area following the outer peripheral surface of the flowpath membrane element of the outer ring-shaped flowpath during backwash, and improve filtration efficiency and cleaning efficiency while curbing the accumulation of deposits on the membrane surface during filtration and during backwash. This filtration membrane module comprises: a membrane element equipped with a primary-side flowpath on the outside of a hollow cylindrical filtration surface; and a cylindrical housing positioned on the outside thereof. A flow
(Continued)

adjuster is positioned inside the primary-side flowpath. A flow adjuster for backwash is positioned inside the secondary-side flowpath, which is an outer ring-shaped flowpath between the membrane element and the housing. The flow adjuster and the flow adjuster for backwash comprise spiral-shaped fins or the like in order to exhibit a centrifugal separation function in an area that follows the outer peripheral surface of the membrane element or the filtration surface.

5 Claims, 10 Drawing Sheets

(52) U.S. Cl.
CPC ........... *B01D 63/067* (2013.01); *B01D 65/02* (2013.01); *B01D 65/08* (2013.01); *B01D 2313/08* (2013.01); *B01D 2313/19* (2013.01); *B01D 2315/10* (2013.01); *B01D 2321/04* (2013.01); *B01D 2321/2016* (2013.01)

(56) References Cited

U.S. PATENT DOCUMENTS

| | | | | |
|---|---|---|---|---|
| 4,107,048 | A * | 8/1978 | Darash | B01D 35/147 210/407 |
| 5,024,771 | A * | 6/1991 | Chiarito | B01D 29/114 210/791 |
| 5,294,339 | A | 3/1994 | Jorgens | |
| 6,077,436 | A | 6/2000 | Rajnik et al. | |
| 2007/0163942 | A1 * | 7/2007 | Tanaka | B01D 63/043 210/321.89 |
| 2011/0210067 | A1 * | 9/2011 | Kato | B01D 61/147 210/634 |
| 2015/0008178 | A1 | 1/2015 | Miyahara et al. | |

FOREIGN PATENT DOCUMENTS

| | | |
|---|---|---|
| GB | 1 405 432 A | 9/1975 |
| JP | 48-96460 A | 12/1973 |
| JP | 52-49353 U | 4/1977 |
| JP | 52-133238 U | 10/1977 |
| JP | 53-142383 A | 12/1978 |
| JP | 62-273008 A | 11/1987 |
| JP | 11-57355 A | 3/1999 |
| JP | 2000-15012 A | 1/2000 |
| JP | 2003-183019 A | 7/2003 |
| JP | 2006-263517 A | 10/2006 |
| JP | 2006-263640 A | 10/2006 |
| JP | 2011-16037 A | 1/2011 |
| JP | 2014-184362 A | 10/2014 |
| JP | 2015-66495 A | 4/2015 |
| JP | 2017-64689 A | 4/2017 |
| JP | 6129389 B1 | 5/2017 |
| JP | 6151469 B1 | 6/2017 |
| JP | 6144447 B1 | 7/2017 |
| WO | WO 99/56851 A1 | 11/1999 |
| WO | WO 2013/147272 A1 | 10/2013 |
| WO | WO 2016/024056 A1 | 2/2016 |

OTHER PUBLICATIONS

International Search Report for PCT/JP2018/023641 dated Aug. 28, 2018.
Supplementary European Search Report for European Application No. 18820914.2 dated Mar. 31, 2021.

* cited by examiner (A)

(B)

(C)

(A)

(B)

(A)

(B)

(C)

(D)

(A)

(B)

(C)

FILTRATION MEMBRANE MODULE AND FILTRATION PROCESSING METHOD

TECHNICAL FIELD

The present invention relates to a filtration membrane module and a filtration processing method, and a filtration membrane module particularly suitable for a crossflow filtration processing method using a ceramic filter and a filtration processing method.

BACKGROUND ART

A ceramic filter is a microfiltration device which uses a membrane made of ceramic as a filter, and a filtration membrane such as MF membrane (Micro filtration), UF membrane (Ultra filtration), NF membrane (Nano filtration) and the like having pore size of several μm is used for the filtration processing by selecting the type or mesh size depending on the physical properties and purpose of the material to be processed (Patent Documents 1 to 6).

As for the purpose of the filtration processing, there are separation, condensation, purification, solvent substitution, pH adjustment, conductivity adjustment, fine particle washing, fine particle surface treatment, classification and the like of the material to be processed, and by filtering waste liquid, it also helps to reduce waste product and protect the environment.

In general, the filtration processing is roughly classified into two kinds of a total amount filtration system and a crossflow filtration system, and ceramic filter is usually operated in the crossflow system.

The crossflow filtration system is a system wherein the filtration membrane surface can be always washed away by creating a flow almost parallel to the membrane surface, and filtration is carried out while curbing clogging due to accumulation of the adhering substances such as suspended substances and colloids in the fluid to the filtration membrane surface.

As mentioned above, because the crossflow filtration system is a system of carrying out the filtration while curbing clogging, in general, it has been known that accumulation of adhering substances on the membrane surface is curbed as the flow velocity of the membrane surface (of the flow of the processing fluid, the flow velocity in the region along the membrane surface of the filtration membrane) is higher. That is, it has been known that the flow amount or the flow velocity of the processing fluid on the filtration membrane markedly affect the filtration characteristics and wash away of the adhering substances.

However, as the membrane surface flow velocity is increased higher and higher, it is necessary to enhance the strength of pressure-resistance of the circulation route, and to increase facility cost to provide high-power pump equipment or the like as a matter of course, and further the energy consumption and running costs required for the operation are increased. Therefore, the present situation is that the filtration processing has been carried out by designing an economical membrane surface flow velocity in the relation to the required processing amount and washing effect.

More specifically, the ceramic filter has a substantially cylindrical shape as a whole, and provides a form in which several tubular flowpaths penetrate through inside the cylinder, and the filtration is carried out by circulating a pressurized processing fluid from one end side to the other end side of the tubular flowpath. An inner diameter of the tubular flowpath is about several mm to several cm or so, and usually the filtration is carried out by calculating the flow velocity of the processing fluid relative to this inner diameter.

However, as mentioned above, the flow velocity of the fluid which flows the tubular flowpath is rapid at the center side and slower at the outer side where the filtration surface exists (membrane surface flow velocity). Accordingly, even when an average flow velocity of the fluid in the tubular flowpath is simply increased, the membrane surface flow velocity cannot efficiently be heightened, thus it does not lead effective use of the energy.

Also, in the case of a slurry containing fine particles, since the fine particles form aggregate, it is difficult to wash the cleaning object contained in the aggregate.

Next, although the crossflow filtration system is a system of carrying out the filtration while curbing clogging, when used for certain extent, clogging occurs due to accumulation of adhering substances to fine pores or the like. Thus, by carrying out backwash in which a fluid for washing is passed from the outside of the ceramic filter to the inside of the tubular flowpath, clogging is eliminated. The fluid for washing to be used for backwash is an organic solvent, various kinds of washing liquids, pure water or the like, but in this case, too, a long time and a large amount of the fluid for washing is required, so that it has also been desired to reduce the amount of the fluid for washing and to increase in washing efficiency.

A rotary filtering plate type filtering machine which employs a crossflow filtration system and is able to efficiently remove a solid component continuously over a long time has been proposed as shown in Patent Document 7. This filtering machine described in Patent Document 7 is comprised of a pair of a disk-shaped chamber plates fixed to a rotary shaft, and a scraper in which is disposed in a filtration room and fixed to a housing so as to scrape a cake layer that accumulates on the filtration surface of the pair of the filtration plates, but it was difficult to apply such a dynamic removing means to a filtration membrane module provided with a hollow cylindrical filtration membrane in which a filtration processing is carried out by feeding the processing fluid with pressure to the primary side by crossflow.

In Patent Documents 8 and 9, there is disclosure of an invention relating to a filtration membrane module wherein, in a filtration membrane module provided with a hollow cylindrical filtration surface in which a processing fluid is fed by pressure to a primary side and a filtration is carried out by crossflow, wherein a flow adjuster arranged in the primary side flowpath is provided, the flow adjuster is configured to change the flow of the processing fluid passing through the primary side flowpath without being driven by itself, and to give a circumferential component of the primary side flowpath to the flow of the processing fluid passing through the primary side flowpath.

However, in Patent Document 8, for example, a spirally twisted plate called a rotating element is installed in a module, an effect of generating turbulence is described, but this is not to give a centrifugal separation effect to the processing fluid. In addition, in Patent Document 9, there is disclosure that a spiral-shaped member called a "turbulent flow inducer" is held by a support pipe and turbulent flow is compulsorily and automatically imparted to influent. However, there is no description that the "turbulent flow inducer" held by the support pipe gives a centrifugal separation effect to the influent.

PRIOR ART DOCUMENTS

Patent Documents

Patent Document 1: Japanese Patent Laid-Open Publication No H11-057355
Patent Document 2: International Patent Laid-Open Publication No. WO 99/056851
Patent Document 3: Japanese Patent Laid-Open Publication No 2006-263517
Patent Document 4: Japanese Patent Laid-Open Publication No 2006-263640
Patent Document 5: International Patent Laid-Open Publication No. WO 13/147272A
Patent Document 6: Japanese Patent Laid-Open Publication No 2014-184362
Patent Document 7: Japanese Patent Laid-Open Publication No 2011-016037
Patent Document 8: Japanese Utility Model Publication No. S52-133238
Patent Document 9: Japanese Utility Model Publication No. S52-49353A

SUMMARY OF THE INVENTION

Problems to be Solved by the Invention

An object of the present invention is to provide a filtration membrane module and a filtration processing method, wherein in the case where the processing condition of the filtration processing (various conditions of the filtration processing such as diameters of flowpath of the primary side flowpath in the filtration membrane module and in an outer ring-shaped flowpath between a membrane element and an inner peripheral surface of a housing, its flowpath length, flow velocity, fluid pressure, density and viscosity, etc., of the fluid) is set to the same, as compared with the conventional filtration apparatus and filtration method, a centrifugal separation effect and a membrane surface flow velocity (among flows of the processing fluid, flow velocity in a region along a membrane surface of a filtration membrane) are not only enhanced, but also filtration efficiency can be enhanced while curbing accumulation of adhering substances on the membrane surface.

In addition, an object of the present invention is to provide a filtration membrane module and a filtration processing method wherein, energy consumption necessary for the filtration can be reduced.

An object of the present invention is to provide a filtration membrane module and a filtration processing method wherein, in the case where the processing condition is set to the same, as compared with the conventional filtration apparatus and filtration method, a centrifugal separation effect in the outer peripheral surface of the membrane element and a membrane surface flow velocity (among the flow of the processing fluid, flow velocity in a region along the outer peripheral surface of the membrane element) are not only enhanced, but also efficiency of the backwash processing can be enhanced.

Also, an object of the present invention is to provide a filtration membrane module and a filtration processing method wherein, energy consumption necessary for a backwash processing can be reduced.

Means to Solve the Problems

The present invention is directed to a filtration membrane module having a cylindrical filtration surface at which filtration processing is carried out with crossflow by feeding a processing fluid under pressure to a primary side flowpath, wherein the primary side flowpath is positioned outside a hollow cylindrical filtration surface, and a flow adjuster configured so that a flow of the processing fluid passing through the primary side flowpath is changed without being driven itself, and a centrifugal separation function is exhibited to the processing fluid which flows along the filtration surface in the primary side flowpath is arranged in the primary side flowpath of the filtration membrane module.

The present invention can be executed as a filtration membrane module suitable for crossflow filtration processing. That is, a membrane element provided with at least one tubular flowpath defined by a hollow cylindrical filtration surface and a cylindrical housing disposed outside the membrane element are provided, the primary side flowpath is configured by an outer ring-shaped flowpath between the membrane element and an inner peripheral surface of the housing, and a secondary side flowpath is configured by the tubular flowpath, whereby being applied to a filtration membrane module which performs crossflow filtration. At that time, the flow adjuster is spiral-shaped fins laid in the tubular flowpath, and the flow adjuster is configured so that a centrifugal separation function is exhibited to the processing fluid in the region along the filtration surface in the primary side flowpath.

The present invention can be executed as a filtration membrane module suitable for external pressure crossflow filtration processing. That is, the a membrane element provided with at least one tubular flowpath defined by a hollow cylindrical filtration surface and a cylindrical housing disposed outside the membrane element are provided, the primary side flowpath is configured by an outer ring-shaped flowpath between the membrane element and an inner peripheral surface of the housing, and a secondary side flowpath is configured by the tubular flowpath, whereby being applied to an external pressure type filtration membrane module which performs external pressure crossflow filtration. At that time, the flow adjuster is spiral-shaped fins laid in the outer ring-shaped flowpath, and is configured to lead the flow of the processing fluid passing through the outer ring-shaped flowpath to be a spiral state, and to act a centrifugal force on the processing fluid passing through the outer ring-shaped flowpath.

The spiral-shaped fins may be a pipe or a round bar formed in a coiled shape or may be a belt-like flat plate formed in a screw (auger) shape.

In the case where the present invention is applied to an internal pressure type filtration membrane module which performs an internal pressure crossflow filtration processing, it can be also executed as provided with a flow adjuster for backwash arranged in the outer ring-shaped flowpath. The flow adjuster for backwash changes the flow of the fluid for washing passing through the outer ring-shaped flowpath without being driven itself, and by changing the flow of the fluid for washing passing through the outer ring-shaped flowpath with the flow adjuster for backwash, as compared with a flow velocity in the region along the outer peripheral surface in the case where the flow adjuster for backwash is not arranged, a wall surface fluid accelerating function that increases the fluid velocity in the region along the outer peripheral surface of the membrane element in the outer ring-shaped flowpath among the fluids for washing is configured to exhibit.

The flow adjuster for backwash can be executed as spiral-shaped fins laid in the outer ring-shaped flowpath. The spiral-shaped fins of the flow adjuster for backwash may be a pipe or a round bar formed in a coiled shape or may be a belt-like flat plate formed in a screw (auger) shape.

In addition, the present invention is to provide a filtration processing method wherein, using any of the above-mentioned filtration membrane modules, crossflow filtration processing is subjected to the processing fluid for the purpose of at least one or more of concentration, purification, solvent substitution, pH adjustment, conductivity adjustment, fine particle washing, fine particle surface treatment and classification of the processing fluid.

When the filtration membrane module suitable for the external pressure crossflow filtration processing is used, it is advantageous to execute as a method of filtering the processing fluid containing a plurality of particles having different particle diameters. When the present invention is applied to the external pressure crossflow filtration processing, at the time of passing the processing fluid through in the outer ring-shaped flowpath, the processing fluid flows while rotating in the axial direction of the primary side flowpath instead of turbulent flow state, thus, the centrifugal force for the particles having a large particle size is larger than the centrifugal force for the particles having a smaller particle size among the particles, and the particles having the large particle size move away from the membrane element by movement to the housing side, whereby a process is performed to make it difficult for the particles having the small particle size to inhibit passing through the membrane element. According to this procedure, a crossflow filtration processing of the processing fluid for the purpose of at least one or more of concentration, purification, solvent substitution, pH adjustment, conductivity adjustment, fine particle washing, fine particle surface treatment and classification of the processing fluid can be carried out.

Effects of the Invention

The present invention can provide a filtration membrane module and a filtration processing method, wherein as compared with the conventional filtration apparatuses and filtration methods, the membrane surface flow velocity can be enhanced, and filtration efficiency can be improved while curbing accumulation of adhering substances on the membrane surface.

Also, the present invention can provide a filtration membrane module and a filtration processing method which can reduce energy consumption necessary for the filtration processing.

The present invention could be provided a filtration membrane module and a filtration method, wherein as compared with the conventional filtration apparatuses and filtration methods, the membrane surface flow velocity at the filtration surface of the membrane element can be increased and efficiency of backwash processing can be improved.

Also, the present invention can provide a filtration membrane module and a filtration processing method which could reduce energy consumption necessary for backwash processing.

EMBODIMENTS TO CARRY OUT THE INVENTION (Internal Pressure Crossflow Filtration Processing)

Hereinafter, embodiments of the present invention will be explained with reference to the drawings.

The crossflow filtration processing is roughly classified into an internal pressure crossflow filtration processing and an external pressure crossflow filtration processing. The internal pressure crossflow filtration processing is a processing method in which a pressurized processing fluid is passed through a membrane element provided with a tubular flowpath inside thereof as a primary side flowpath, and then the filtration liquid generated by the filtration processing is passed through an outside secondary side flowpath. On the other hand, the external pressure crossflow filtration processing is a processing method of using the tubular flowpath inside the membrane element as a secondary side flowpath, and outside the membrane element is made the primary side flowpath, the processing fluid is passed through the outside primary side flowpath and then the filtration liquid generated by the filtration processing is passed through the inside secondary side flowpath of the membrane element. The membrane element is provided with a filtration membrane constituting a filtration surface and a support body 19 which supports the filtration membrane, and the filtration membrane is usually provided on the surface at which the membrane element and the primary side flowpath are in contact. The support body 19 to be used is the one which does not inhibit the processing by the filtration membrane.

More specifically mentioned, in the case of the internal pressure crossflow filtration processing, as shown in FIG. 2(B), the filtration membrane is provided along inner wall surface of the tubular flowpath inside the membrane element, and in the case of the external pressure crossflow filtration processing, as shown in FIG. 2(C), the filtration membrane is provided along the outer peripheral surface of the membrane element.

Figure 4:
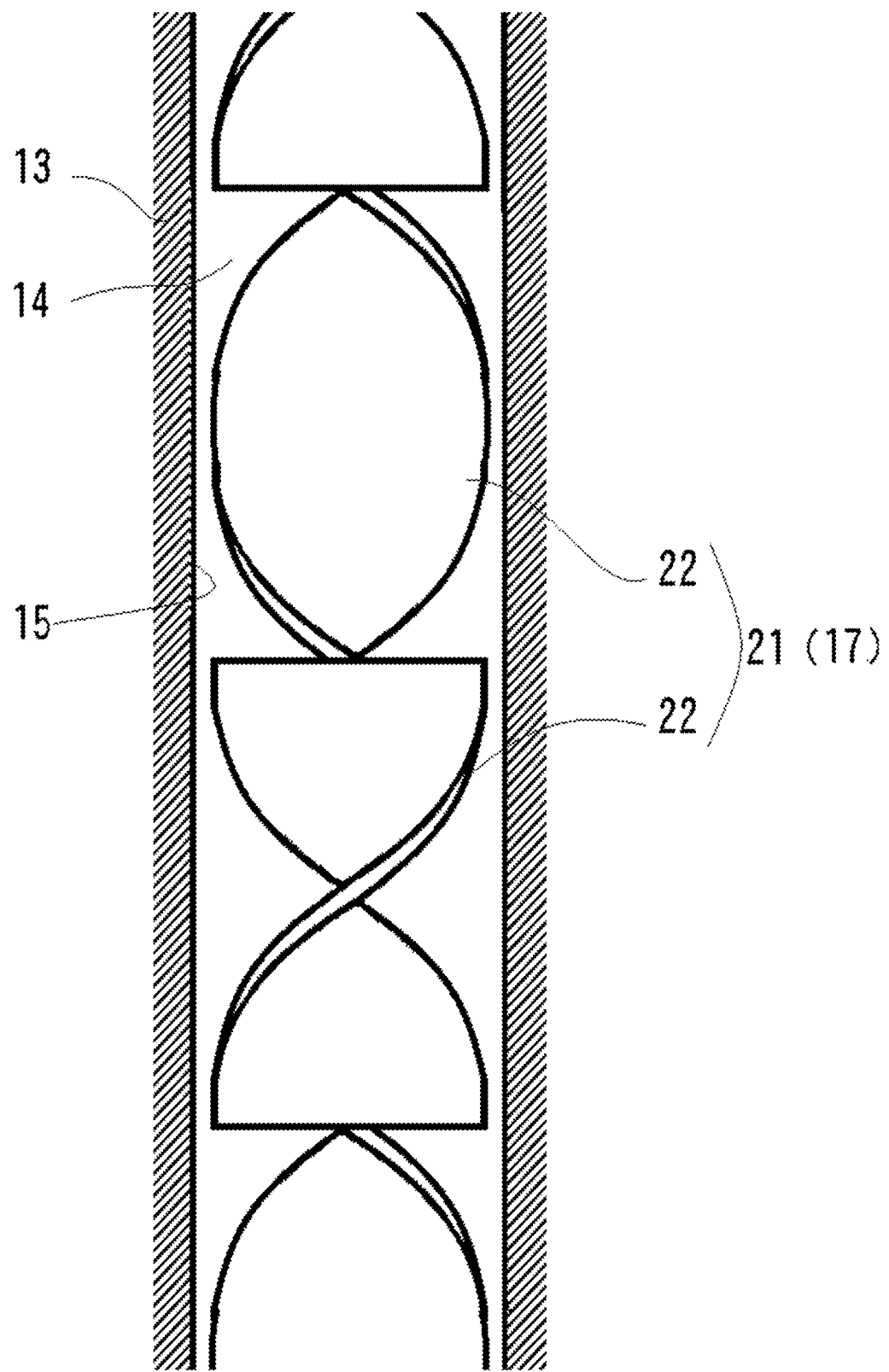
FIG. 4 is a principal part of sectional explanatory view of the filtration membrane module according to the first embodiment of the present invention.
Figure 5:
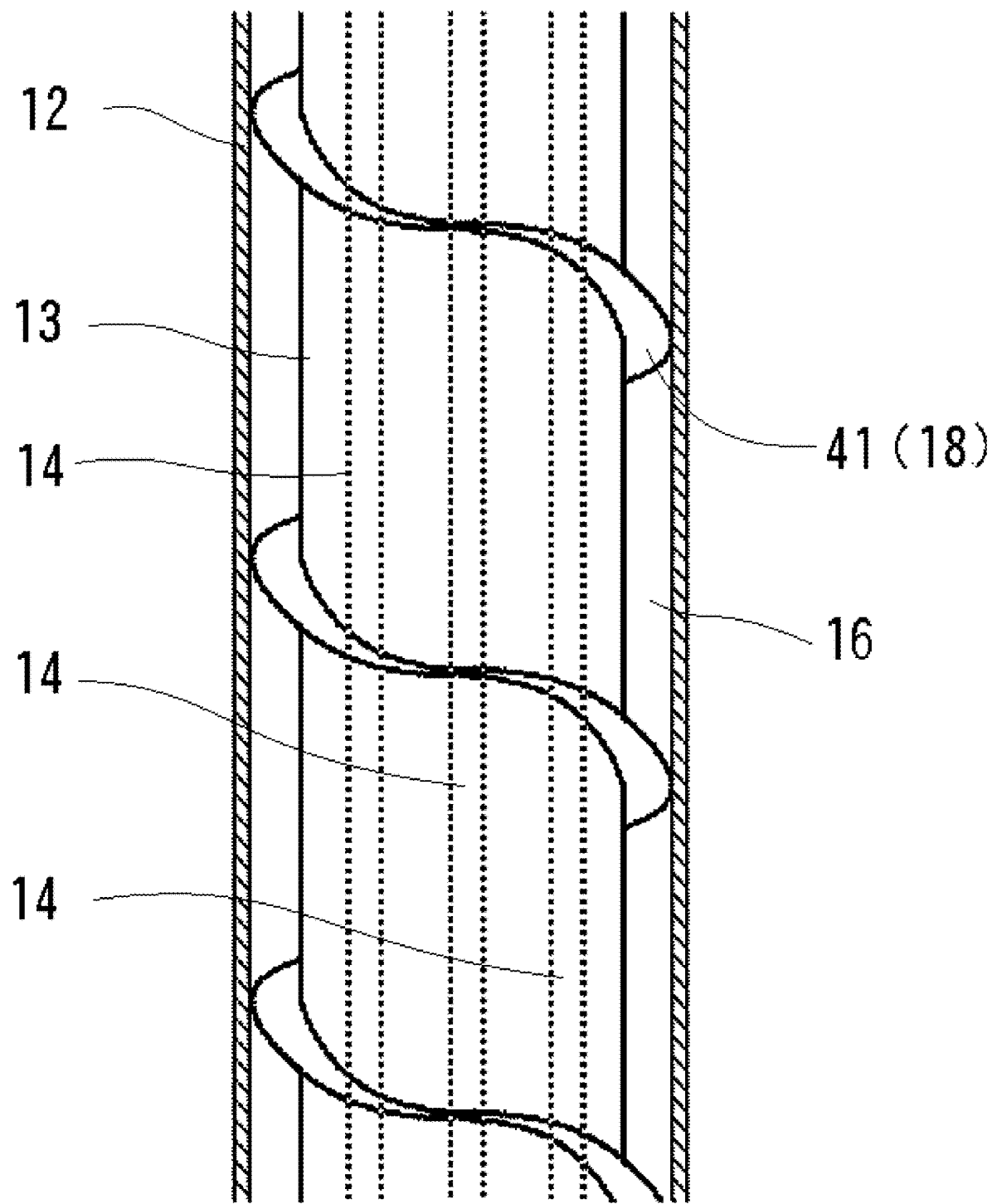
FIG. 5 is a principal part of sectional explanatory view of the filtration membrane module according to the third embodiment of the present invention.
Figure 6:
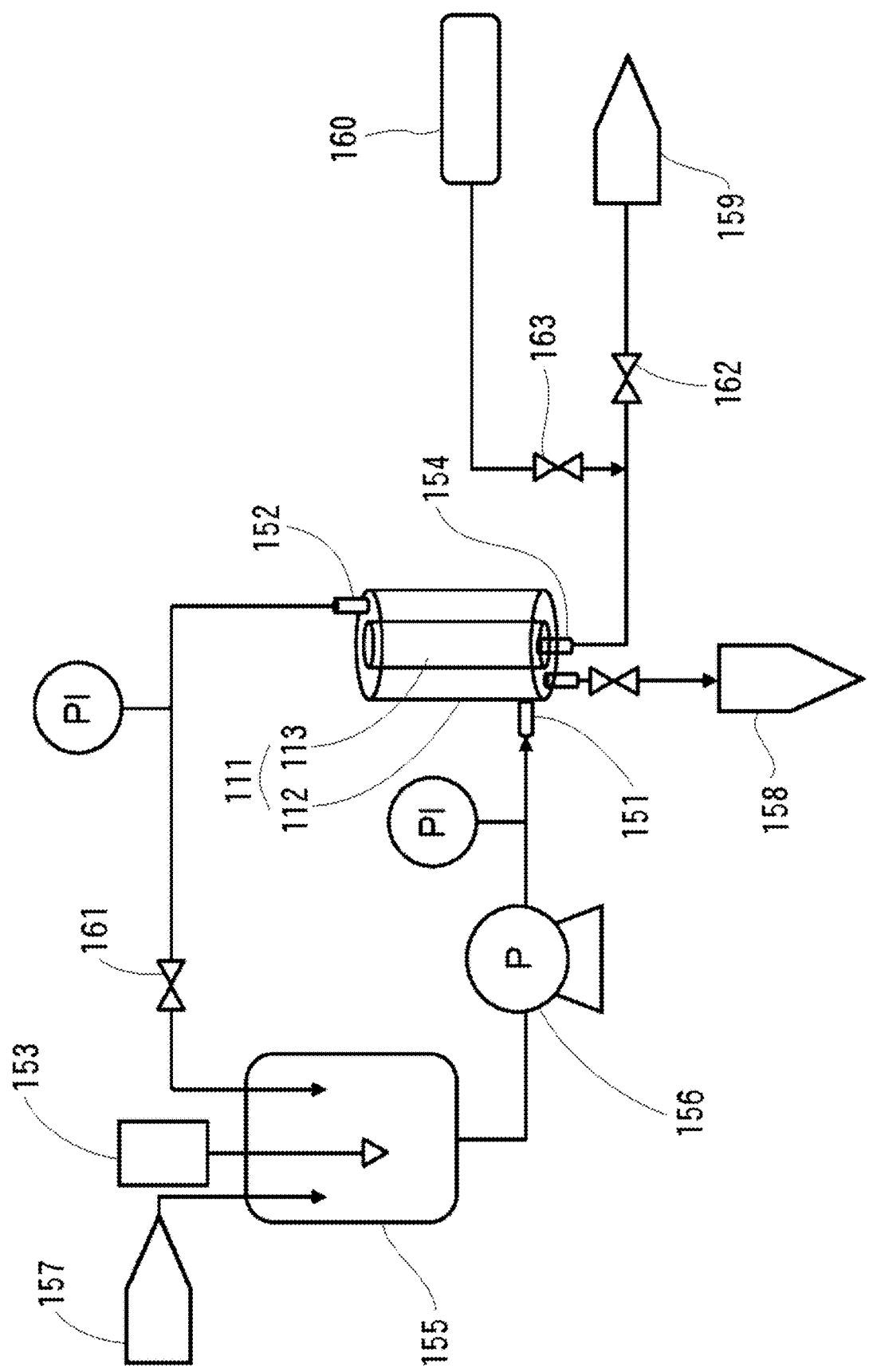
FIG. 6 is a circuit diagram of the filtration apparatus to which the filtration membrane module according to the fourth embodiment of the present invention is applied.

The present invention can be applied to both filtration processings, three embodiments (the first to the third embodiments) with regard to the filtration apparatus suitable for the internal pressure crossflow filtration processing are shown by referring to FIG. 1 to FIG. 5, and the embodiments with regard to the filtration apparatus suitable for the external pressure crossflow filtration processing are shown by referring to FIG. 6 et seq.

(Outline of Filtration Apparatus)

Figure 1:
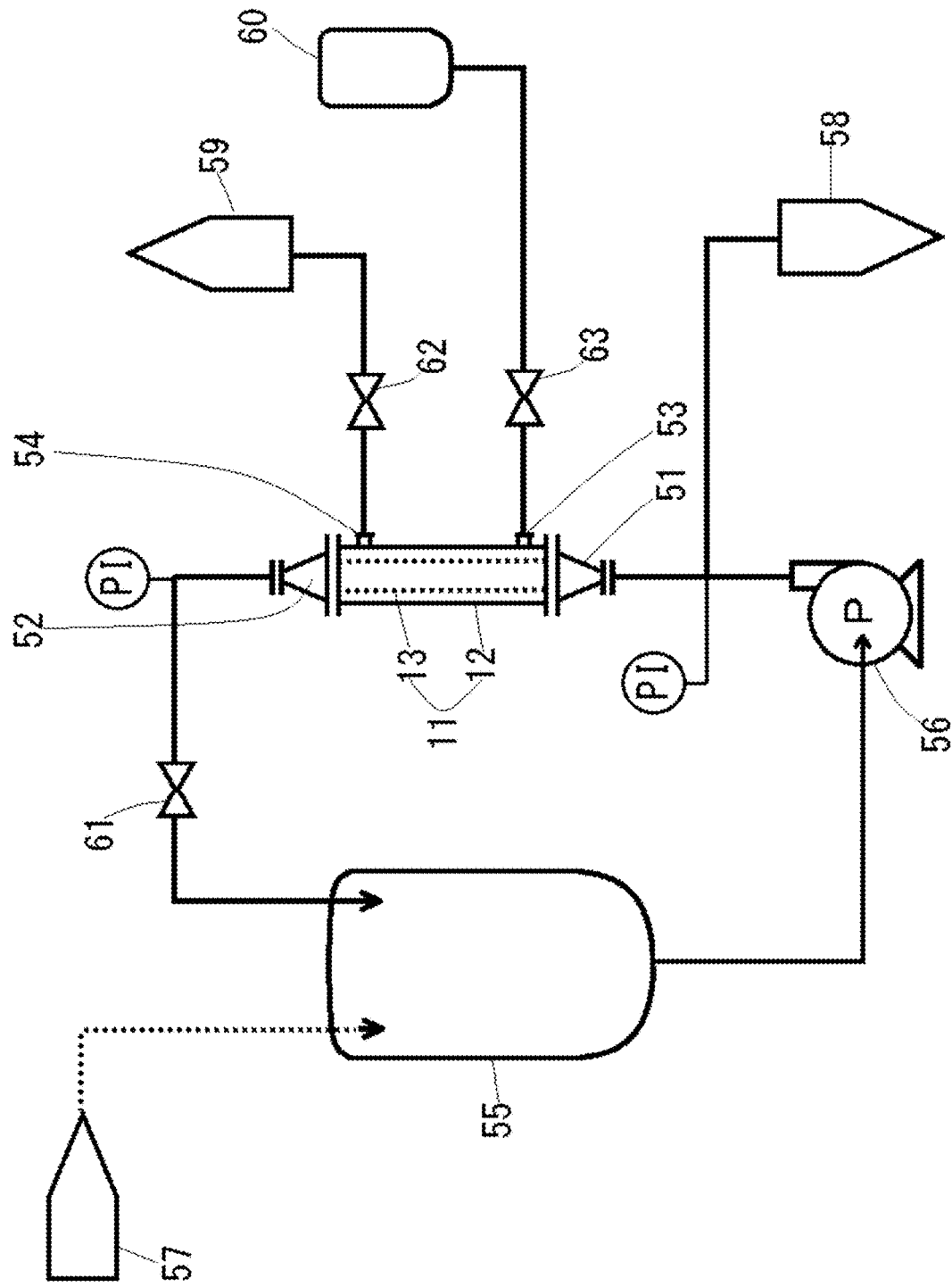
FIG. 1 is a circuit diagram of the filtration apparatus to which the filtration membrane modules according to the first to the third embodiments of the present invention are applied.

First, mainly referring to FIG. 1, an outline of the filtration apparatus suitable for the internal pressure crossflow filtration processing will be explained. The circuit diagram shown in FIG. 1 shows an illustrative example of basic configuration of apparatus that performs filtration processing on various kinds of the processing fluids such as a fine particle dispersion solution and the like, and the filtration apparatus can be executed with applying various kinds of changes such as using plurality of the filtration membrane modules 11 and using stirring apparatus. This filtration apparatus comprises the filtration membrane module 11 which has a housing 12 and a membrane element 13, and a processing liquid tank 55 connected to a primary side introduction port 51 of the filtration membrane module 11 via a liquid feeding pump 56, and the processing fluid inside the processing liquid tank 55 is fed by pressure into the filtration membrane module 11 by the liquid feeding pump 56. The processing fluid fed by pressure passes through the primary side flowpath 14 (see FIG. 2(A)) in the membrane element 13 and is returned to the processing liquid tank 55 from a primary side discharge port 52 via a return valve 61. To the processing liquid tank 55, processing fluid or the like is supplied from a liquid supply source 57 as necessary. The liquid supplied from the liquid supply source 57 may be washing liquid or dilution liquid in addition to the processing fluid and may be supplied to the processing liquid tank 55 from plurality of supply sources through different paths. The presence or absence of supply of the liquid from the liquid supply source 57 and the type and amount of the liquid may be changed depending on the purpose of the filtration and performed.

By passing the processing fluid fed by pressure through the primary side flowpath 14 in the membrane element 13, crossflow filtration processing is performed. This filtration processing may be performed in one pass and also may be performed repeatedly by a circulation path connecting the filtration membrane module 11 and the processing liquid tank 55. The filtration liquid generated by the filtration processing is discharged to outside the membrane element 13, and then, is discharged to a filtration liquid discharge destination 59 from a secondary side discharge port 54 provided on the housing 12 via a filtration liquid valve 62.

The processing fluid which has been subjected to the filtration processing is discharged to a processed material discharge destination 58 from a path provided at appropriate part in the circulation path.

The above mentioned is the circuit and the flow of the fluid to be used at the time of the usual filtration processing, when washing the membrane element 13, a fluid for washing (organic solvent, washing liquid, pure water and the like) from a washing liquid supply source 60 is fed by pressure to a secondary side introduction port 53 provided at the housing 12 via a washing liquid valve 63. The fluid for washing introduced into the housing 12 is introduced from the outer peripheral surface of the membrane element 13 into the primary side flowpath 14 inside thereof and discharged from the primary side introduction port 51 and the primary side discharge port 52 to the processing liquid tank 55 and the like. In addition, not shown in the drawing, the washing liquid may be circulated.

(Outline of Filtration Membrane Module 11)

Figure 2:
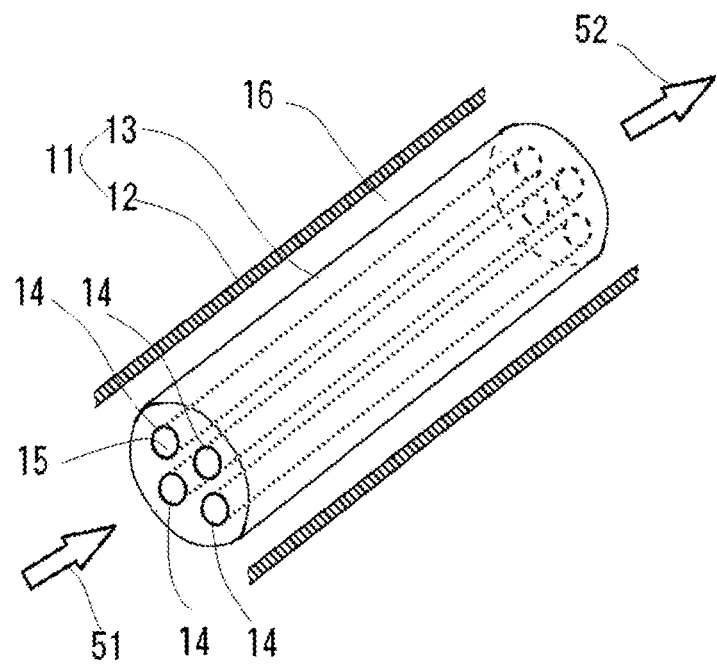
FIG. 2(A) is a principal part of sectional explanatory view of the filtration membrane module to which the first to third embodiments of the present invention are applied. (B) is a principal part of sectional view which shows the relationship of the component of the filtration membrane module in the case of internal pressure crossflow filtration, and (C) is a principal part of sectional view which shows the relationship of the component of the filtration membrane module in the case of external pressure crossflow filtration.
Figure 2:
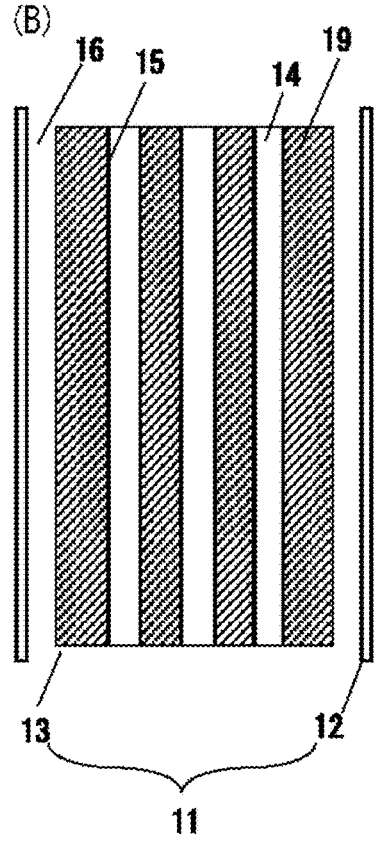
Figure 2:
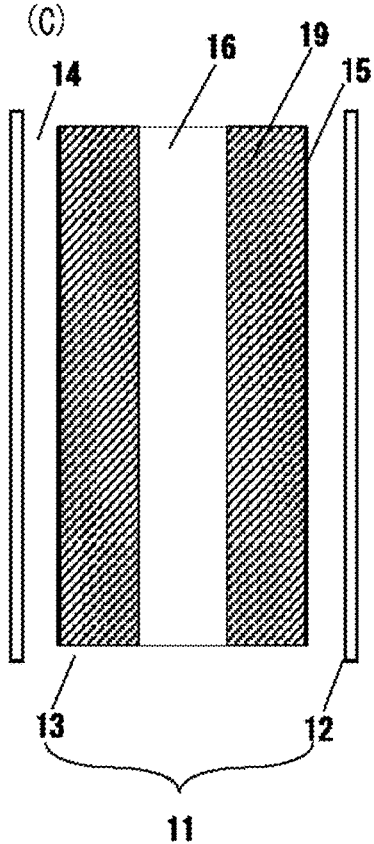

Next, mainly referring to FIG. 2, outline of the filtration membrane module 11 will be explained. The filtration membrane module 11 comprises membrane element 13 and cylindrical housing 12 disposed outside the membrane element 13. The membrane element 13 comprises at least one (four in FIG. 2) primary side flowpath 14 which is tubular flowpath defined by a hollow cylindrical filtration surface 15. Both ends of the membrane element 13 are connected to the above-mentioned primary side introduction port 51 and the primary side discharge port 52, respectively and are connected to an external circuit via the primary side introduction port 51 and the primary side discharge port 52, pressurized processing fluid is introduced into the primary side flowpath 14 from the primary side introduction port 51, whereby the processing fluid after the crossflow filtration processing is discharged from the primary side discharge port 52.

As for the filtration membrane constituting the filtration surface 15, ceramic-based materials such as aluminum oxide, zirconium oxide and titanium oxide are mainly used, but it may be a membrane made of stainless or glass, or an organic membrane such as polyethylene, tetrafluoroethylene, polypropylene, cellulose acetate, polyacrylonitrile, polyimide, polysulfone, polyethersulfone and the like. These are used for the filtration processing by selecting the type and size according to the physical properties of the material to be processed or the purpose of the filtration processing such as MF membrane (Micro filtration), UF membrane (Ultra filtration), NF membrane (Nano filtration) and the like. Incidentally, since the ceramic filter is made of ceramic, it is particularly advantageous because there are many merits such as corrosion resistance, heat resistance, pressure resistance, back pressure resistance, durability, cleanability.

The support body 19 which supports the filtration membrane of the filtration surface 15 is generally a porous ceramic material but may be a tube made of a stainless steel or a porous resin.

The housing 12 is a hollow cylindrical body and configured by a material having liquid tightness and pressure resistance such as metal, synthetic resin or the like. A space between inner wall of the housing 12 and outer wall of the membrane element 13 configures a secondary side flowpath 16 which is outer ring-shaped flowpath. Whereas the drawing is omitted, both ends of the housing 12 and the membrane element 13 are supported by supporting members, and one filtration membrane module 11 is configured by including other constituent members such as the secondary side introduction port 53 and the secondary side discharge port 54 arranged in the housing 12.

Incidentally, FIG. 2(B) illustrates the relationship amongst the filtration membrane module 11, the housing 12, the membrane element 13, the primary side flowpath 14, the filtration surface (filtration membrane) 15, the secondary side flowpath 16 and the support body 19 in the internal pressure crossflow filtration processing, and FIG. 2(C) illustrates the relationship amongst the respective elements in the external pressure crossflow processing.

Figure 3:
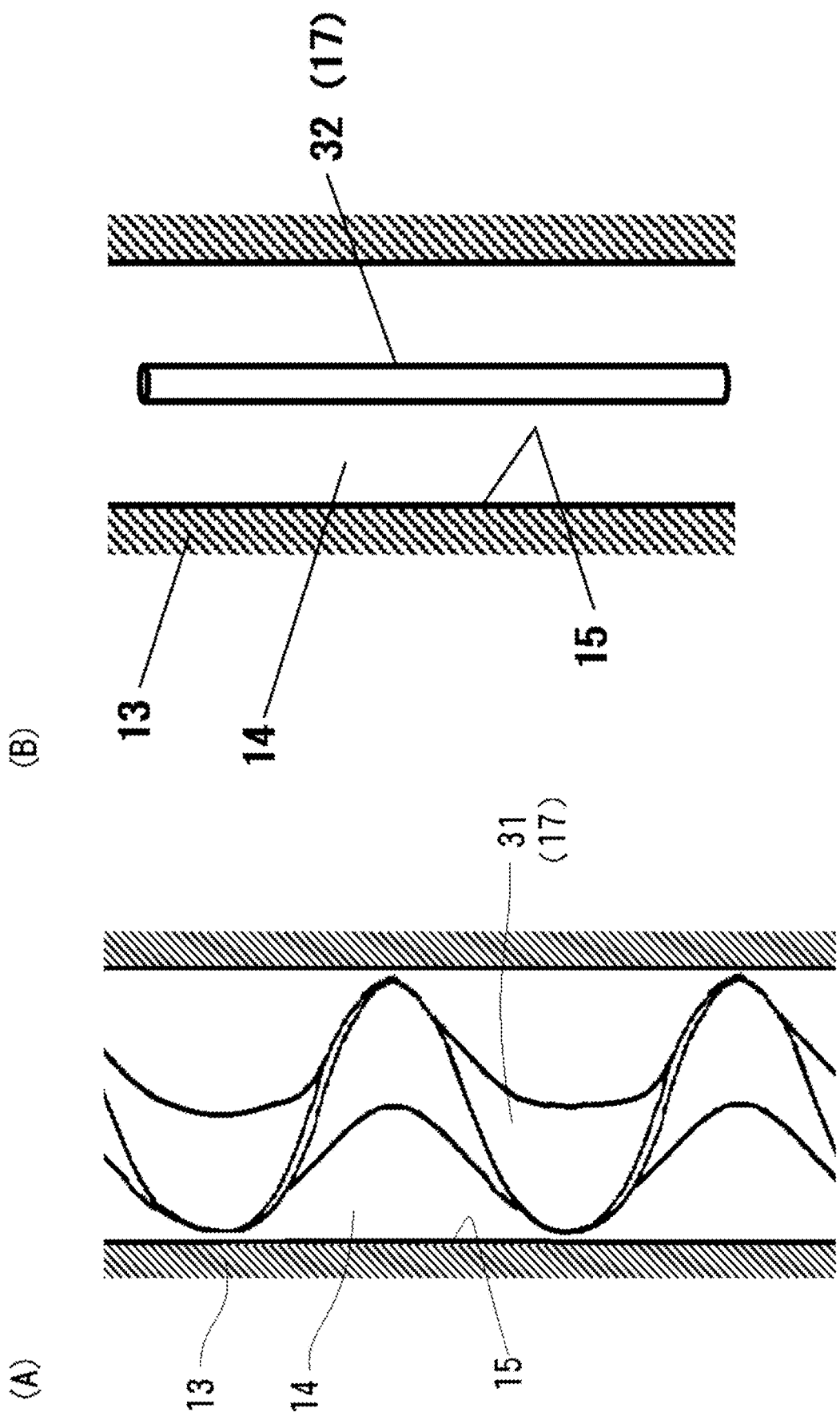
FIG. 3(A) is a principal part of sectional explanatory view of the filtration membrane module according to the second embodiment of the present invention, and (B) is a principal part of sectional explanatory view of the filtration membrane module according to other embodiments of the present invention.

In the present invention, the flow adjuster 17 shown in FIG. 3 or FIG. 4 is arranged inside the primary side flowpath 14. Also, the flow adjuster for backwash 18 shown in FIG. 5 is arranged inside the secondary side flowpath 16 which is the outer ring-shaped flowpath. The flow adjuster 17 and the flow adjuster for backwash 18 may be used in combination, or only one of them may be arranged to perform.

First Embodiment: See FIG. 4

The flow adjuster 17 according to this embodiment is executed as a static mixer 21. The static mixer 21 is that a plurality of elements 22 in a form of rectangular blade being twisted with 180 degrees is arranged in the axial direction of the primary side flowpath 14, in the elements 22, a right element and a left element having different twisted directions are generally arranged alternately, however, When applying as the flow adjuster 17, stirring/mixing and dispersing action due to dividing action or a reversing action of the fluid are also effective, a conversion action of the fluid by the elements 22 is important. That is, when the flow direction of the processing fluid changes along streamlined shape surface of the twisted surface of the elements 22, a flow which rotated in the axial direction is generated in the processing fluid. By this, the fluid flowing in the center part of the tubular primary side flowpath 14 of the processing fluids moves to the inner peripheral surface, and the fluid flowing in the inner peripheral surface moves to the center part so as to be pushed by the moved fluid. As a result, the fluid becomes a rotating flow in flowpath having a semicircular cross-section partitioned by the elements 22, whereby a fluid acceleration function which can increase the flow velocity at the region along the filtration surface 15 in the primary side flowpath 14 is exhibited, as compared with the case where no static mixer 21 is provided. Accordingly, the elements 22 may be arranged the right element and the left element having different twisted direction alternately but may be arranged either one of the right element or the left element continuously.

As an illustrative example of which the above-mentioned stirring/mixing and dispersing action due to the dividing action or the reversing action of the fluid are effective, a case in which the processing fluid is a slurry containing fine particles may be mentioned. In the case of the slurry, since the fine particles form aggregates, it is difficult to remove the target material contained in the aggregates by filtration, but by effectively exhibiting the above-mentioned stirring/mixing, and dispersing action, an action of removing the target material contained in the aggregates is promoted.

This static mixer 21 may be arranged over the entire length of the primary side flowpath 14, or may be arranged in a part, or may be arranged intermittently.

The structure in which the static mixer 21 is arranged in the primary side flowpath 14 may be exemplified by a structure in which both ends or one end of the static mixer 21 is/are fixed to the supporting members at the both ends of the filtration membrane module 11, or a structure in which both ends or one end of the static mixer 21 is/are supported directly or indirectly to both ends or one end of the membrane element 13. Incidentally, the outer periphery of the elements 22 may be in contact with or fixed to the filtration surface 15 of the primary side flowpath 14 or may be spaced slightly apart.

Second Embodiment: See FIG. 3(A)

The flow adjuster 17 according to this embodiment is executed as the spiral-shaped fins 31. The spiral-shaped fins 31 are extended in the axial direction of the primary side flowpath 14 while spirally turning, and become a spiral flow which flow along the spiral flow path defined by the spiral fins 31, whereby a fluid acceleration function which can increase the flow velocity at the region along the filtration surface 15 in the primary side flowpath 14 is exhibited. In addition, since an effect of a centrifugal force acts in the spiral flow, a classification effect is also generated in which large fine particles preferentially transfer in the direction of the filtration surface and small fine particles transfer in the direction apart from the filtration surface. As a result, clogging is less likely to occur, so that there is an advantage that the processing ability of the filter itself increases. Incidentally, the direction of twist of the spiral-shaped fins 31 may be a right spiral or a left spiral, or both spirals may be changed in the axial direction of the primary side flowpath 14. By providing a plurality of the spiral-shaped fins 31, a multiple spiral structure of a double or more layers may be used.

This spiral-shaped fins 31 may be arranged over the entire length of the primary side flowpath 14, or may be arranged in a part, or may be arranged intermittently.

The structure in which the spiral-shaped fins 31 is arranged in the primary side flowpath 14 may be exemplified by a structure in which both ends or one end of the spiral-shaped fins 31 is/are fixed to the supporting members at the both ends of the filtration membrane module 11, or a structure in which both ends or one end of the spiral-shaped fins 31 is/are supported directly or indirectly to both ends or one end of the membrane element 13. Incidentally, the outer periphery of the spiral-shaped fins 31 may be in contact with or fixed to the filtration surface 15 of the primary side flowpath 14 or may be spaced slightly apart.

Other Embodiment of Flow Adjuster 17: FIG. 3(B)

The flow adjuster 17 needs only to increase the flow velocity in the region along the filtration surface 15 in the primary side flowpath 14, thus the flow adjuster 17 can be executed in an embodiment other than the static mixer 21 or the spiral-shaped fins 31. For example, by inserting a round bar or a round tube 32 in the primary side flowpath 14, the embodiment which makes a flow of the fluid flowing through the central part of the primary side flowpath 14 move to the region along the filtration surface 15 in the primary side flowpath 14 can be shown. Incidentally, when the round tube is used, it is necessary to close its both ends by an appropriate means.

However, as long as these round bar or round tubes change the flow direction of the fluid, they become resistant to the flow. Accordingly, as a result of lowering the flow velocity of the whole processing fluid by the resistance, while considering the point that the flow velocity in the region along the filtration surface 15 in the primary side flowpath 14 should not be lowered, it can be executed by setting the diameter and the number thereof.

Although not shown in the drawing, for example, by providing an inclined plate or a conical body on a support bar extending in the axial direction and the like, the embodiment which makes a flow of the fluid flowing through the central part of the primary side flowpath 14 move to the region along the filtration surface 15 in the primary side flowpath 14 can be shown. However, as long as these static mixer 31, spiral shaped fins 31, inclined plate or conical body change the flow direction of the fluid, they become resistant to the flow. Accordingly, as a result of lowering the flow velocity of the whole processing fluid by the resistance, while considering the point that the flow velocity in the region along the filtration surface 15 in the primary side flowpath 14 should not be lowered, it is appropriate to execute by setting the shape thereof, value of inclined angle or lead angle, or size and number thereof.

Third Embodiment: See FIG. 5

The third embodiment relates to an embodiment of the flow adjuster for backwash 18. In this example, the flow adjuster for backwash 18 is executed as spiral-shaped fins 41. The spiral-shaped fins 41 are extended in the axial direction of the secondary side flowpath 16 that is the outer ring-shaped flowpath while spirally turning, the fluid for washing for backwash becomes a spiral flow which flow along the spiral flowpath defined by the spiral-shaped fins 41, whereby a wall surface fluid acceleration function which can increase the flow velocity at the region along the outer peripheral surface of the membrane element 13 in the secondary side flowpath 16 is exhibited.

In addition, when the washing liquid is circulated and used for the purpose of reducing used amount of the washing liquid, it is also a great advantage that in the spiral flow, foreign materials in the washing liquid are transferred to the housing side by the action of the centrifugal force and a clear washing liquid can be preferentially supplied to the filter side. Incidentally, the direction of twist of the spiral-shaped fins 41 may be a right spiral or a left spiral, or the spirals may be changed in the axial direction of the secondary side flowpath 16. This spiral-shaped fins 41 may be provided over the entire length of the secondary side flowpath 16, may be provided in a part, or may be provided intermittently. By providing a plurality of the spiral-shaped fins 41, a multiple spiral structure of a double or more layers may be used.

The structure in which the spiral-shaped fins 41 is arranged in the secondary side flowpath 16 may be exemplified by a structure in which both ends or one end of the spiral-shaped fins 41 is/are fixed to the supporting members at the both ends of the filtration membrane module 11, or a structure in which both ends or one end of the spiral-shaped fins 41 is/are supported directly or indirectly to both ends or one end of the housing 12 or the membrane element 13. Incidentally, the outer periphery of the spiral-shaped fins 41 may be in contact with or fixed to the outer peripheral surface or the inner peripheral surface of the secondary side flowpath 16 or may be spaced slightly apart.

Other Embodiments of Flow Adjuster for Backwash 18: No Drawing

The flow adjuster for backwash 18 needs only to increase the flow velocity in the region along the outer peripheral surface of the membrane element 13 in the secondary side flowpath 16, thus the flow adjuster for backwash 18 can be executed in an embodiment other than the static mixer 21. For example, by providing member such as an inclined plate on a support bar extending in the axial direction of the secondary side flowpath 16, or providing an inclined projection on the inner peripheral surface of the housing 12, the embodiment which makes a flow of the fluid flowing through the central part of the secondary side flowpath 16 move to the region along the outer peripheral surface of the membrane element 13 in the secondary side flowpath 16 can be shown. However, as long as these static mixer 31, the inclined plate and the member such as projection change the flow direction of the fluid, they become resistant to the flow. Accordingly, as a result of lowering the flow velocity of the whole fluid for washing by the resistance, while considering the point that the flow velocity in the region along the outer peripheral surface of the membrane element 13 in the secondary side flowpath 16 should not be lowered, it is appropriate to execute by setting the shape thereof, value of inclined angle or lead angle, or size and number thereof.

(External Pressure Crossflow Filtration Processing)

Next, by referring to FIG. 6 and FIG. 7, outline of the filtration apparatus suitable for the external pressure crossflow filtration processing will be explained.

The circuit diagram shown in FIG. 6 shows an illustrative example of basic configuration of the apparatus that performs filtration processing on various kinds of the processing fluids such as a fine particle dispersion solution, and can be carried out with various modifications of using a plurality of the filtration membrane modules 111, and using stirring apparatus or the like, which are the same as previously shown in the case of the internal pressure crossflow filtration processing.

This filtration apparatus provides, as shown in FIGS. 7(A) and (B), respectively, filtration membrane module 111 having housing 112 and membrane element 113, an outer ring-shaped flowpath between the housing 112 and the membrane element 113 becomes a primary side flowpath 114, and a tubular flowpath in the membrane element 113 becomes a secondary side flowpath 116.

A processing liquid tank 155 is connected to the primary side introduction port 151 of the filtration membrane module 111 via a liquid feeding pump 156, and the processing fluid inside the processing liquid tank 155 is fed by pressure into the filtration membrane module 111 by the liquid feeding pump 156. The processing fluid fed by pressure passes through the primary side flowpath 114 which is the outer ring-shaped flowpath between the housing 112 and the membrane element 113, and then returned to the processing liquid tank 155 from a primary side discharge port 152 via a return valve 161. For the processing liquid tank 155, the processing fluid or the like is supplied from a liquid supply source 157 as necessary.

When particles that may cause aggregation or precipitation are included in the processing fluid, it is also preferable that a stirring device 153 be arranged in the processing liquid tank 155 and the processing fluid inside the processing liquid tank 155 be stirred to curb aggregation or precipitation thereof.

The liquid supplied from the liquid supply source 157 may be washing liquid or dilution liquid in addition to the processing fluid and may be supplied to the processing liquid tank 155 from plurality of supply sources through different paths. The presence or absence of supply of the liquid from the liquid supply source 157 and the type and amount of the liquid may be changed depending on the purpose of the filtration and performed.

By passing the processing fluid fed by pressure through the primary side flowpath 114, the crossflow filtration processing is performed with the outer peripheral surface of the membrane element 113 as the filtration surface 115. This filtration processing may be performed in one pass and also may be performed repeatedly by a circulation path connecting the filtration membrane module 111 and the processing liquid tank 515. The filtration liquid generated by the filtration processing is discharged to inside of the membrane element 113, and then, is discharged to a filtrated liquid discharge destination 159 from a secondary side discharge port 154 connecting to a secondary side flowpath 116 which is a tubular flowpath via a filtration liquid valve 162.

The processing fluid which has been subjected to the filtration processing is discharged to a processed material discharge destination 158 from a path provided at appropriate part in the circulation path.

The above mentioned is the circuit and the flow of the fluid to be used at the time of the usual filtration processing, when washing the membrane element 113, a fluid for washing (organic solvent, washing liquid, pure water and the like) from a washing liquid supply source 160 is fed by pressure to a secondary side flowpath 116 of a filtration membrane module 111 via a washing liquid valve 163. The fluid for washing introduced into the filtration membrane module 111 is flown out from the inner peripheral surface of the secondary side flowpath 116 which is a tubular flowpath of the membrane element 113 to an outer peripheral surface of the membrane element 113 and via the primary side flowpath 114 and discharged from the Primary side introduction port 151 and the primary side discharge port 152 to the processing liquid tank 155 and the like. In addition, not shown in the drawing, the washing liquid may be circulated.

(Outline of Filtration Membrane Module 111)

Next, referring to FIG. 7, outline of the filtration membrane module 111 will be explained. The filtration membrane module 111 comprises membrane element 113 and cylindrical housing 112 disposed outside the membrane element 113. The outer ring-shaped flowpath between inner peripheral surface of the cylindrical housing 112 and the membrane element 113 configures a primary side flowpath 114, and at least one (four in FIG. 2) tubular flowpath penetrating the membrane element 113 configures a secondary side flowpath 116.

Both ends of the filtration membrane module 111 are connected to the above-mentioned primary side introduction port 151 and the primary side discharge port 152, respectively and are connected to an external circuit via the primary side introduction port 151 and the primary side discharge port 152, pressurized processing fluid is introduced into the primary side flowpath 114 from the primary side introduction port 151, whereby the processing fluid after the crossflow filtration processing is discharged from the primary side discharge port 152.

For the membrane element 113 configuring the filtration surface 115, the same materials with the filtration membrane of the internal pressure crossflow filtration processing can be employed. Also, the support body which supports the filtration membrane is generally a porous ceramic material but may be a tube made of a stainless steel or a porous resin.

The housing 112 is a hollow cylindrical body and configured by a material having liquid tightness and pressure resistance such as metal, synthetic resin or the like.

Whereas the drawing is omitted, both ends of the housing 112 and the membrane element 113 are supported by supporting members, and one filtration membrane module 111 is configured by including other constituent members such as the introduction port and the discharge port arranged in the housing 112.

(Flow Adjuster 117)

Figure 7:
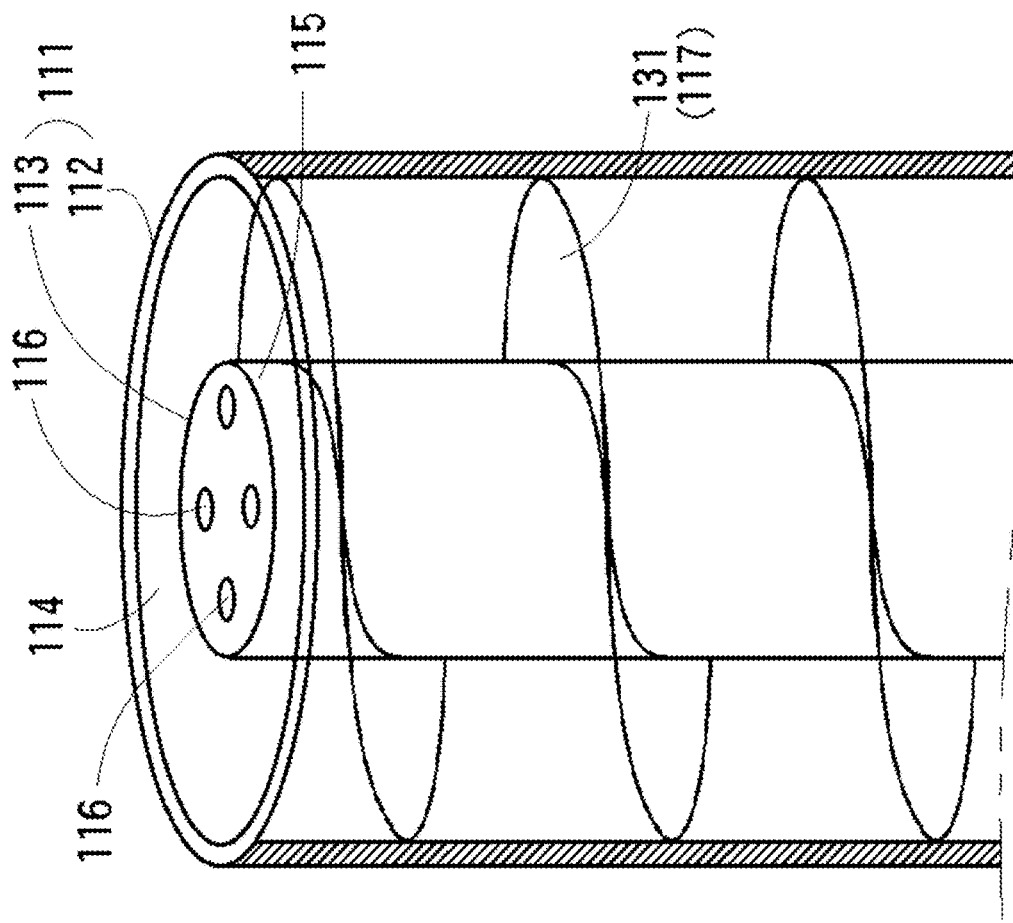
FIG. 7(A) is a principal part of sectional explanatory view of the filtration membrane module according to the fourth embodiment of the present invention, and (B) is a principal part of sectional explanatory view showing a modified example of the filtration membrane module according to the same embodiment.
Figure 7:
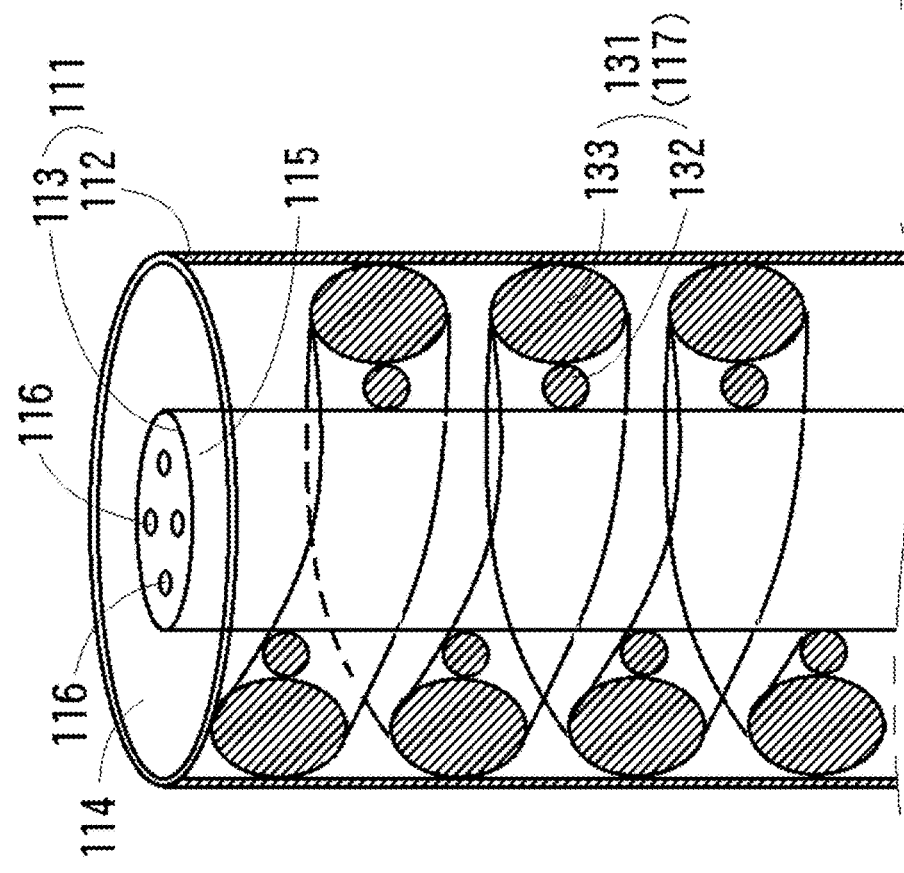

In the present invention, a flow adjuster 117 shown in FIG. 7 is arranged inside the primary side flowpath 114.

The flow adjuster 117 according to this embodiment is executed as the spiral-shaped fins 131. The spiral-shaped fins 131 are extended in the axial direction of the primary side flowpath 114 while spirally turning. This spiral-shaped fins 131 changes the flow of the processing fluid flowing in the axial direction of the primary side flowpath 114 without driving itself (cause to change so as to give a circumferential component). By this, the processing fluid flowing along the spiral flow path defined by the spiral fins 131 becomes a spiral flow, whereby centrifugal force is acted. As a result, large fine particles relatively move in the outward direction of the radial direction (that is, the direction apart from the filtration surface 115), while small fine particles relatively move in the inward direction of the radial direction (that is, the direction approaching to the filtration surface 115). Accordingly, the processing is promoted in which only particles having a small particle diameter among the particles in the processing fluid are allowed to pass to the secondary side flowpath 116 via the filtration surface 115, while only particles having a large particle diameter in the processing fluid are remained in the primary side flowpath 114.

Thus, the filtration membrane module 111 according to this embodiment is advantageous for application of the fluid processing that is required to provide a classification action to the processing fluid.

(Comparison of Action of Flow Adjusters)

In the internal pressure crossflow filtration processing according to the first to the third embodiments previously shown, the processing fluid is passed through the primary side flowpath 14 which is a tubular flowpath in the membrane element 13. Centrifugal force is acted on the processing fluid by the spiral flow caused by the spiral-shaped fins 31 in the tubular flowpath.

In the case of splitting off solid solution from the processing fluid, processing is performed in which the particles of the solid component in the processing fluid do not pass through the membrane element 13 and only the liquid component passes through the membrane element 13 and moves to the secondary side flowpath 16.

At that time, when centrifugal force works, relatively large particles relatively approaches to the filtration surface 15 on the inner wall surface of the tubular flowpath, and relatively small particles are relatively far from the filtration surface 15 on the inner wall surface of the tubular flowpath. Here, the relatively small particles have relatively close in size to the filtration opening of the filtration surface 15, and which cause clogging of the filtration surface 15, thus by relatively apart from the filtration surface 15, occurrence of the clogging of the filtration surface 15 can be curbed.

On the other hand, in the case of accompanying classification process for separating solid/solid of the processing fluid, for sieving, it is necessary to operate so that only the small particles pass through the filtration surface 15 and no large particles pass through the filtration surface 15. However, in the internal pressure crossflow filtration processing, as mentioned above, when the centrifugal force works on the processing fluid, relatively large particles relatively approach to the filtration surface 15 of the inner wall surface of the tubular flowpath, and relatively small particles relatively far away from the filtration surface 15 of the inner wall surface of the tubular flowpath. Accordingly, when the classification process is accompanied by the internal pressure crossflow filtration processing, there is a risk that the centrifugal force may act in the direction of lowering the efficiency of the classification process.

On the contrary, in this embodiment according to the external pressure crossflow filtration processing, the filtration surface 115 is arranged inside the primary side flowpath 114. As a result, contrary to the case of the above-mentioned internal pressure crossflow filtration processing, when the centrifugal force acts on the processing fluid, the relatively large particles relatively move to the outside of the primary side flowpath 114 which is the outer ring-shaped flowpath thereby being relatively away from the filtration surface 115 and the relatively small particles relatively move to inside of the primary side flowpath 114 thereby relatively approaching to the filtration surface 115. Accordingly, when the classification process is accompanied by the external pressure crossflow filtration processing, the centrifugal force is to act in the direction of improving the efficiency of the classification process.

(Relationship Between Flow Amount of Primary Side Flowpath 114 and Classification Size)

When the classification is carried out by using the filtration membrane module 111 according to this embodiment, it is preferable to change the flow amount (primary side flow amount) of the primary side flowpath 114 depending on the target classification size.

As mentioned above, by being generated the spiral flow in the primary side flowpath 114, centrifugal force is applied to the particles contained in the processing fluid. Therefore, the classification speed is accelerated by setting the flow amount so as to that the particles larger than the classification size move to the flowpath outside (housing side). For example, when the particles having a size of 15 µm or less are classified (removed) by using the membrane element 113 having mesh size of 15 µm, it is preferably about 10 L/min (with regard to the liquid flowing between the coils, when the flow velocity is calculated from the cross-sectional area between the coils, it is about 0.72 m/sec) from the experimental results and centrifugal force calculation. When the primary side flow amount is further increased than the above, there is tendency which shows that particles of 15 µm or less (in particular, particles of 10 to 15 µm) which are to be taken out (wish to be sieved) to the secondary side flowpath 116 by passing through the filtration surface 115 of the membrane element 113 are passed through the outside of the filtration surface 115, and a ratio of the particles discharged from the primary side discharge port 152 without passing through the filtration surface 115 becomes large (Comparison of Example B1 and Examples B2 and B3 in Table 3). Accordingly, it is preferable to carry out by adjusting the flow amount of the primary side flowpath 114 depending on the classification size.

(Form of Spiral-Shaped Fins 131)

The form of the spiral-shaped fins 131 is not particularly restricted as long as centrifugal force can be generated by making spiral flow in the processing fluid. Specifically, it may be a plate-like fin as shown in FIG. 7(B) or may be two kinds of fins with large and small as shown in FIG. 7(A). FIG. 7(A) shows cross-sectional shape in which two fins of a small diameter portion 132 having smaller diameter and a large diameter portion 133 having larger diameter in the sectional shape are arranged side by side without being connected, and the small diameter portion 132 is arranged inside the large diameter portion 133. Thus, with regard to the cross-sectional shape along the axial center of the primary side flowpath 114 of the spiral-shaped fins 131, when the area is divided into two of the area near to the filtration surface 115 and the area far from the filtration surface 115, by decreasing the cross-sectional area in the near area compared to the far area, sufficient flowpath area is ensured in the area near to the filtration surface 115, and by restricting the flowpath area in the far area from the filtration surface 115, the entire processing fluid can be brought close to the area near to the filtration surface 115 to improve the processing efficiency.

The direction of twist of the spiral-shaped fins 131 may be a right spiral or a left spiral, or both spirals may be changed in the axial direction of the primary side flowpath 114. By providing a plurality of the spiral-shaped fins 131, a multiple spiral structure of a double or more layers may be used.

Figure 8:
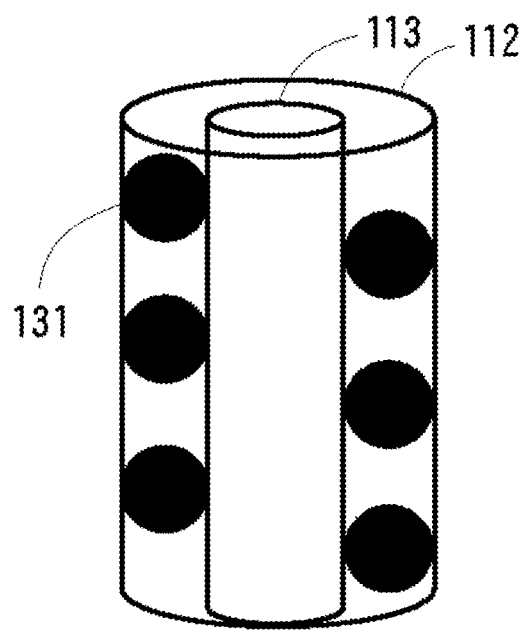
FIGS. 8(A), (B), (C) and (D) are each principal part of sectional views showing modified examples of the spiral fins of the filtration membrane module according to the same embodiment.
Figure 8:
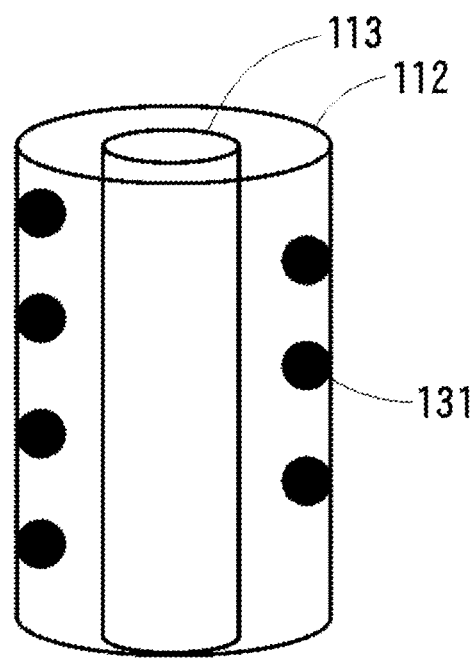
Figure 8:
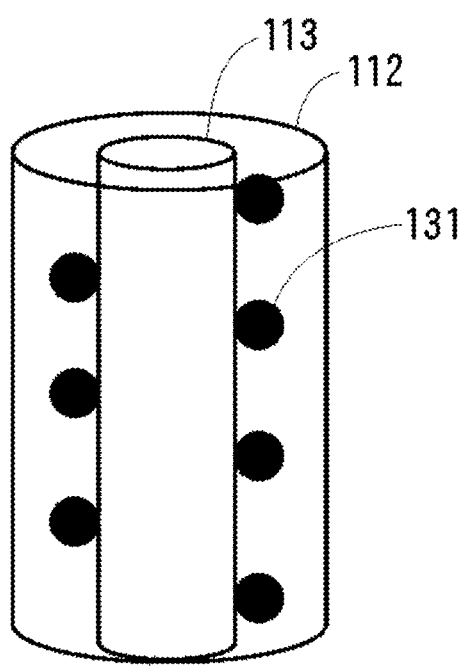
Figure 8:
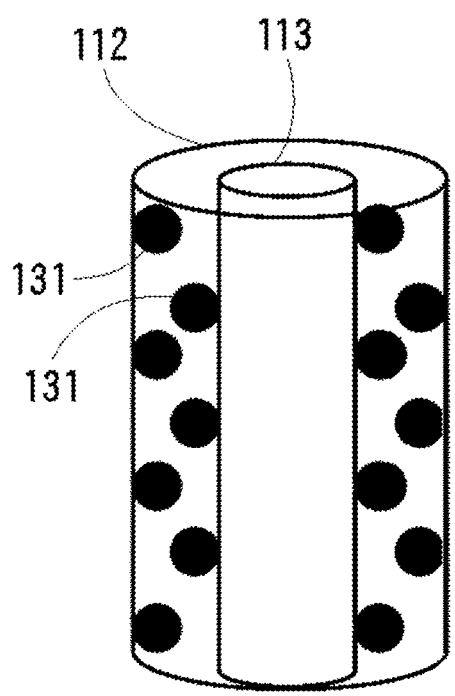

Also, for example, the spiral-shaped fins 131 may be arranged so as to be contact with the housing 112 and the membrane element 113 as shown in FIG. 8(A), may be arranged closer to the inner peripheral surface of the housing 112 as shown in FIG. 8(B), or may be arranged closer to the outer peripheral surface of the membrane element 113 as shown in FIG. 8(C), or further when preparing a multiple layer of spiral structure as shown in FIG. 8(D), one of the spiral-shaped fins 131 may be arranged closer to the inner peripheral surface of the housing 112 and another spiral-shaped fins 131 may be arranged closer to the outer peripheral surface of the membrane element 113.

This spiral-shaped fins 131 may be arranged over the entire length of the primary side flowpath 114, or may be arranged in a part, or may be arranged intermittently.

The structure in which the spiral-shaped fins 131 is arranged in the primary side flowpath 114 may be exemplified by a structure in which both ends or one end of the spiral-shaped fins 131 is/are fixed to the supporting members at the both ends of the filtration membrane module 111, or a structure in which both ends or one end of the spiral-shaped fins 131 is/are supported directly or indirectly to both ends or one end of the membrane element 113. Incidentally, the inner periphery of the spiral-shaped fins 131 may be in contact with or fixed to the filtration surface 115 of the primary side flowpath 114, or may be spaced slightly apart, however it is preferable that be spaced slightly apart. Similarly, the outer periphery of the spiral-shaped fins 131 may be in contact with or fixed to the housing 112 or may be spaced slightly apart.

(Backwash)

As for a main purpose to eliminate clogging of the membrane element 113, backwash can be carried out according to usual manner.

When washing, the fluid for washing from the washing liquid supply source 160 flows out from the inner peripheral surface of the secondary side flowpath 116 which is tubular flowpath of the membrane element 113 to the outer peripheral surface of the membrane element 113 thereby being discharged via the primary side flowpath 114. By this, the particles clogged in the mesh of the membrane element 113 are discharged to the primary side flowpath 114, thus clogging is eliminated. This washing may be carried out regularly or irregularly.

(Relationship Between Secondary Side Discharge Amount and Classification Efficiency)

In the execution, it is preferable to adjust the secondary side discharge amount by changing the opening of the filtration liquid valve 162 at the secondary side. As the secondary side discharge amount is made smaller and smaller, the filtration surface 115 of the membrane element 113 is less likely to be clogged, but the classification speed tends to be slower. On the other hand, as the secondary side discharge amount is made larger and larger, the classification speed becomes faster, but the filtration surface 115 is likely to be clogged, so that it is necessary to increase the number of backwashes. When the clogging of the filtration surface 115 is early, even when a transmitted amount of the particles at the initial stage is large, the total transmitted amount of the particles becomes small, and the classification time may eventually become longer.

Accordingly, it is preferable to adjust the secondary side discharge amount in consideration of the overall classification efficiency.

Modification Example of Membrane Element 113

Figure 9:
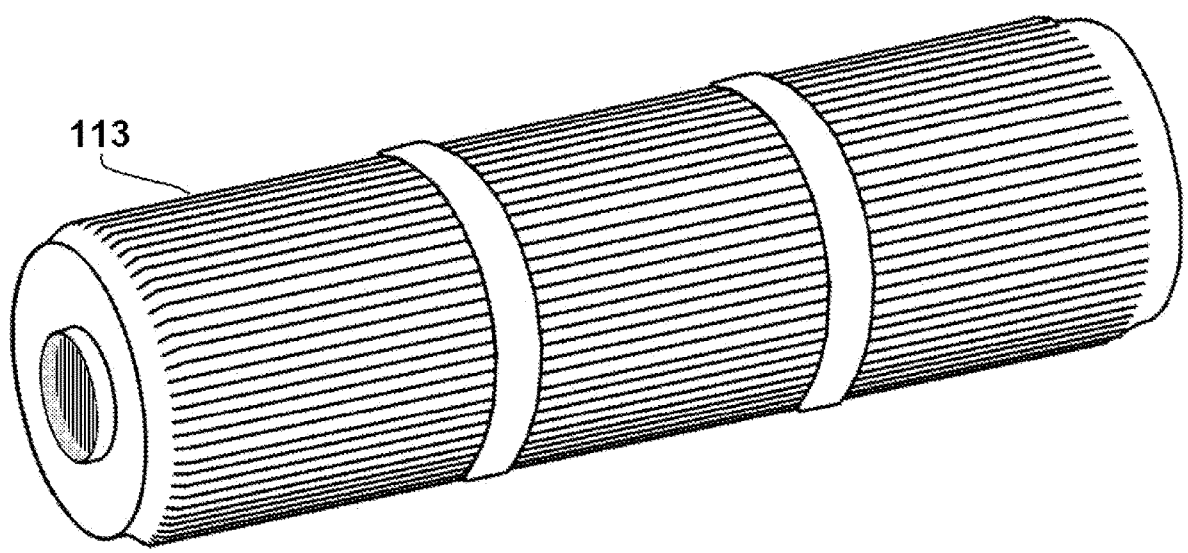
FIG. 9 is a perspective view showing a modified example of the membrane element of the filtration membrane module according to the same embodiment.

The membrane element 113 can also be executed with various changes, and in addition to changing the number or size of the secondary side flowpaths 116, it can be executed by increasing the filtration area by changing the cross-sectional shape of the membrane element 113 to a pleated type having a large number of pleats as shown in FIG. 9.

Modification Example of Filtration Membrane Module 111

The flow adjuster 17 needs only to generate the centrifugal force by creating spiral flow in the processing fluid, thus the flow adjuster 17 can be executed in an embodiment other than the spiral-shaped fins 131. For example, by providing the inclined plate or the conical body in the space extending in the axial direction of the primary side flowpath 114, the embodiment which gives a component to move the fluid flowing the primary side flowpath 114 to the circumferential direction can be shown. However, as long as the spiral-shaped fins 131, the inclined plate and the conical body change the flow direction of the fluid, they become resistant to the flow. Accordingly, while considering the point that the whole flow velocity of the processing fluid is lowered thereby decreasing the processing efficiency, it is appropriate to execute by setting the shape thereof, value of inclined angle or lead angle, or size and number thereof. Incidentally, the flow adjuster 17 shown in the first or the third embodiments may be used in combination in the inside of the secondary side flowpath 116 which is the tubular flowpath.

(Filtration Processing Method)

The filtration membrane module of the present invention can be applied to a crossflow filtration processing method for various purposes such as concentration, purification, solvent substitution, pH adjustment, conductivity adjustment, fine particle washing, fine particle surface processing and classification of the processing fluid, and the like, similarly to the conventional filtration membrane module with the internal pressure crossflow filtration processing and the external pressure crossflow filtration processing. As described above, depending on the purposes or the type or mode of the processing fluid, it can be executed by selecting MF membrane, UF membrane, NF membrane, and the like, and also, can be executed by changing the circuit of the filtration device. For example, in the processing for the purpose of concentrating the processing fluid, the crossflow filtration processing can be carried out by a circulation path without supplying washing liquid or the like to the processing liquid tank during the processing, and in the processing for the purpose of pH adjustment or conductivity adjustment of the processing fluid, it is also possible to apply the invention according to Japanese Patent No. 6,144,447 and Japanese Patent No. 6,151,469 by the applicant of the present application.

EXAMPLES

Hereinafter, Examples are shown for the purpose of enhancing understanding of the present invention, but the present invention should not be understood as being limited to these Examples.

In Examples A1 to A5 shown in Table 1 and Table 2, a filtration membrane module having a flow adjuster 17 shown in FIG. 3(A) was manufactured, and internal pressure crossflow filtration processing was assumed.

In Examples B1 to B6 shown in Table 3, a filtration membrane module having a flow adjuster 117 shown in FIG. 7(A) was manufactured, and in Comparative Example B1, a filtration membrane not having the flow adjuster 117 in Example B1 was manufactured.

In the respective Examples, a mixture of 110 g of PLGA particle relative to 4 kg of an aqueous polyvinyl alcohol solution with a concentration of 1 wt % is used.

The particle size distribution of the PLGA particles in the processing fluid to be processed after mixing is as shown in FIG. 10(A).

TABLE 1

|  | Inner diameter of housing (mm) | Outer diameter of filter (mm) | Inner diameter of filter (mm) | Size of spiral-shaped fins to be inserted (mm) | Flow amount (L/min.) | Flow velocity (m/sec.) | Time until filter is clogged (min.) |
|---|---|---|---|---|---|---|---|
| Comparative Example A1 | 14 | 10 | 6 | — | 5 | 2.95 | 60 |
| Example A1 | 14 | 10 | 6 | 3 | 5 | 3.93 | 80 |
| Example A2 | 14 | 10 | 6 | 4 | 5 | 5.31 | 120 |

Examples A1 to A2

The Examples shown in Table 1 assume the internal pressure crossflow filtration processing, and it is confirmed that change in the flow velocity of the processing fluid when spiral-shaped fins having different sizes are inserted into a ceramic filter having an inner diameter of 6 mm and a time until the filter is clogged.

Comparative Example A1 shows the flow velocity of the inside of the filter in the state that spiral-shaped fins are not inserted.

In either cases where the spiral-shaped fins are inserted, as compared with Comparative Example A1 in which no spiral-shaped fins is inserted, the flow velocity in the inside of the filter is increased due to the centrifugal separation effect generated by the spiral-shaped fins, and the membrane surface flow velocity inside of the filter is larger as the size of the spiral-shaped fins to be inserted is larger. It can be seen that the time until the filter is clogged becomes longer as the centrifugal separation effect and the membrane surface flow velocity increase. That is, when the internal pressure crossflow filtration processing is carried out continuously, if the time until the filter is clogged becomes long, the number/frequency of performing the backwash is reduced, thereby leads to improvement in filtration efficiency as a whole. As the processing fluid, mixture of PLGA particle in an aqueous polyvinyl alcohol solution was used.

Size of filter: Outer diameter φ 10 mm, Inner diameter φ 6 mm, Length 250 mm

Size of housing: Outer diameter φ 16 mm, Inner diameter φ 14 mm, Length 254 mm

Size of inserted spiral-shaped fins (outer diameter of spiral-shaped fins): φ 3 mm, φ 4 mm Flow amount of processing fluid: 5 L/min

TABLE 2

| | Inner diameter of housing (mm) | Outer diameter of filter (mm) | Inner diameter of filter (mm) | Size of spiral-shaped fins to be inserted (mm) | Flow amount (L/min.) | Flow velocity (m/sec.) | Time until filter is clogged (min.) |
|---|---|---|---|---|---|---|---|
| Comparative Example A2 | 84 | 58.5 | 50.5 | — | 30 | 0.24 | 30 |
| Example A3 | 84 | 58.5 | 50.5 | 35 | 30 | 0.48 | 40 |
| Example A4 | 84 | 58.5 | 50.5 | 40 | 30 | 0.67 | 45 |
| Example A5 | 84 | 58.5 | 50.5 | 45 | 30 | 1.21 | 90 |

Examples A3 to A5

The Examples shown in Table 2 assume the internal pressure crossflow filtration processing, and it is confirmed that change in the flow velocity of the processing fluid when spiral-shaped fins are inserted into a ceramic filter having an inner diameter of 50.5 mm and a time until the filter is clogged. Comparative Example A2 shows the flow velocity of the inside of the filter in the state that spiral-shaped fins are not inserted.

Similarly to the Examples in the above-mentioned Table 1, in either cases where the spiral-shaped fins are inserted, as compared with Comparative Example A1 in which no spiral-shaped fins is inserted, the flow velocity in the inside of the filter is increased due to the centrifugal separation effect generated by the spiral-shaped fins, and the membrane surface flow velocity inside of the filter is larger as the size of the spiral-shaped fins to be inserted is larger. It can be seen that the time until the filter is clogged becomes longer as the centrifugal separation effect and the membrane surface flow velocity increase. That is, when the internal pressure crossflow filtration processing is carried out continuously, if the time until the filter is clogged becomes long, the number/frequency of performing the backwash is reduced, thereby leads to improvement in filtration efficiency as a whole. As the processing fluid, mixture of PLGA particle in an aqueous polyvinyl alcohol solution was used.

Size of filter: Outer diameter φ 58.5 mm, Inner diameter φ 50.5 mm, Length 241.5 mm Size of housing: Outer diameter φ 88.9 mm, Inner diameter φ 84 mm, Length 341 mm Size of inserted spiral-shaped fins: φ 35 mm, φ 40 mm, φ 45 mm Flow amount of processing fluid: 30 L/min

TABLE 3

| Comparison of filtration conditions | Comparative Example B1 | Example B1 | Example B2 | Example B3 | Example B4 | Example B5 | Example B6 |
|---|---|---|---|---|---|---|---|
| | Cylindrical type | Cylindrical type | Cylindrical type | Cylindrical type | Cylindrical type | Cylindrical type | Cylindrical type |
| Filter area [m2] | 0.04 | 0.04 | 0.04 | 0.04 | 0.04 | 0.04 | 0.04 |
| Mesh size [μm] | 15 | 15 | 15 | 15 | 15 | 15 | 20 |
| Primary side flow amount [L/min] | 20 | 20 | 10 | 10 | 20 | 5 | 10 |
| Secondary side discharge amount [g/min] | 260 | 260 | 100 | 330 | 850 | 330 | 270 |
| Sampling time [min] | 1.5 | 1.5 | 5 | 1.5 | 0.66 | 1 | 1 |
| Maximum particle transmitted amount [g] | 0.26 | 0.38 | 0.82 | 0.79 | 0.33 | 0.14 | 0.39 |
| Maximum particle concentration [g/mm3] | 0.67 | 0.97 | 1.85 | 1.60 | 0.58 | 0.42 | 1.45 |
| Maximum classification speed [g/min] | 0.17 | 0.25 | 0.16 | 0.53 | 0.50 | 0.14 | 0.39 |
| Time until filter is clogging [min] | 2.5 | 3 | 15 | 3.8 | 1.5 | 6 | 4.2 |
| Reference) Filtration completed time | Not completed within 8 h | — | — | 5 h | — | — | 3 h |

Examples B1 to B6

The results of subjecting to classification process by the external pressure crossflow filtration processing using the respective filtration membrane modules are shown in Table 1.

In Table 1, the filter area indicates a total area of the filtration surface 115 of the membrane element 113, the mesh size indicates a size of the opening of the filtration surface 115 of the membrane element 113, and an experiment for classification (removal) processing of 15 μm or less was performed.

The inner diameter of the housing 112 was 84 mm, the outer diameter of the membrane element 113 was 58.5 mm (in the case of cylindrical type), and the distance between them was 12.75 mm in the radial direction. The spiral-shaped fins 131 are arranged over substantially the entire length of the membrane element 113, diameter of the small diameter portion 132 was 3 mm, diameter of the large diameter portion 133 was 9 mm, and the lead angle was 22°.

As the processing fluid, mixture of PLGA particle in an aqueous polyvinyl alcohol solution was used.

In Table 3, the classification speed was calculated by dividing the particle transmitted amount by the sampling time, and the transmitted amount of the particles per unit time to the secondary side was shown as the classification speed. In order to measure the particle transmitted amount, the secondary side discharged liquid was sampled every predetermined time shown in Table 3, and the particle amount contained in the sampled secondary side discharged liquid was measured by weight.

The maximum particle transmitted amount was obtained by sampling the secondary side discharged liquid every predetermined time, and the particle amount contained in the sampled secondary side discharged liquid was measured by weight as the particle transmitted amount, and the maximum value among the plurality of the sampling results was shown in Table 3.

With regard to the maximum particle concentration, for each of the above-mentioned sampling, the particle concentration was calculated as particle concentration=particle transmitted amount/sampling amount×1,000, and the maximum value among the plurality of the sampling results was shown in Table 3.

With regard to the maximum classification speed, for each above-mentioned sampling, the classification speed was calculated as classification speed=particle transmitted amount/sampling time, and the maximum value among the plurality of the sampling results was shown in Table 3.

(Classification Result)

Figure 10:
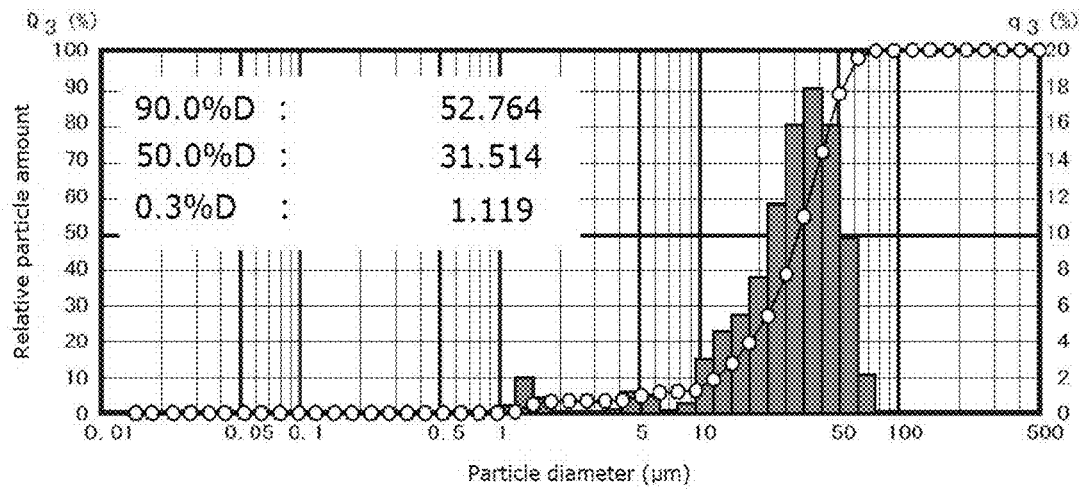
FIG. 10 is a graph showing the particle size distribution of PLGA particles.
Figure 10:
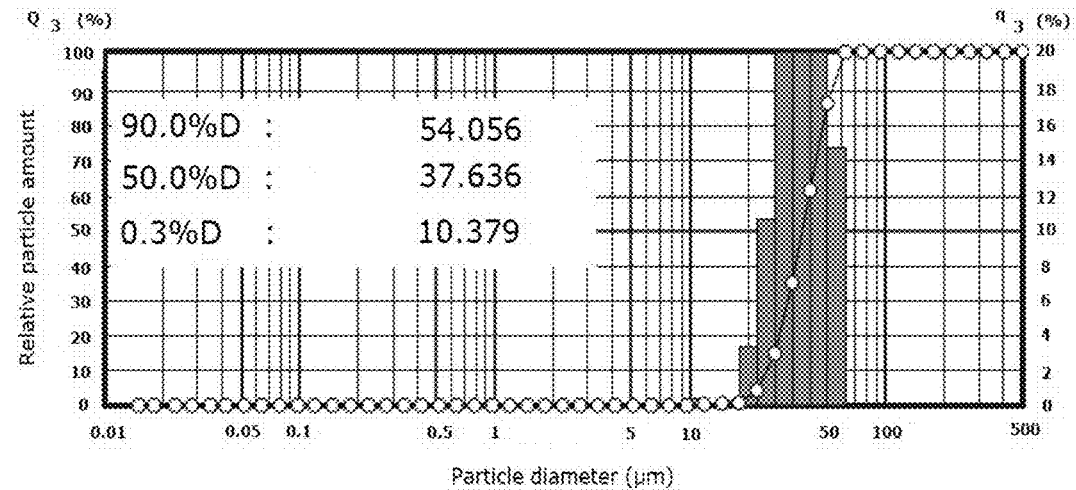
Figure 10:
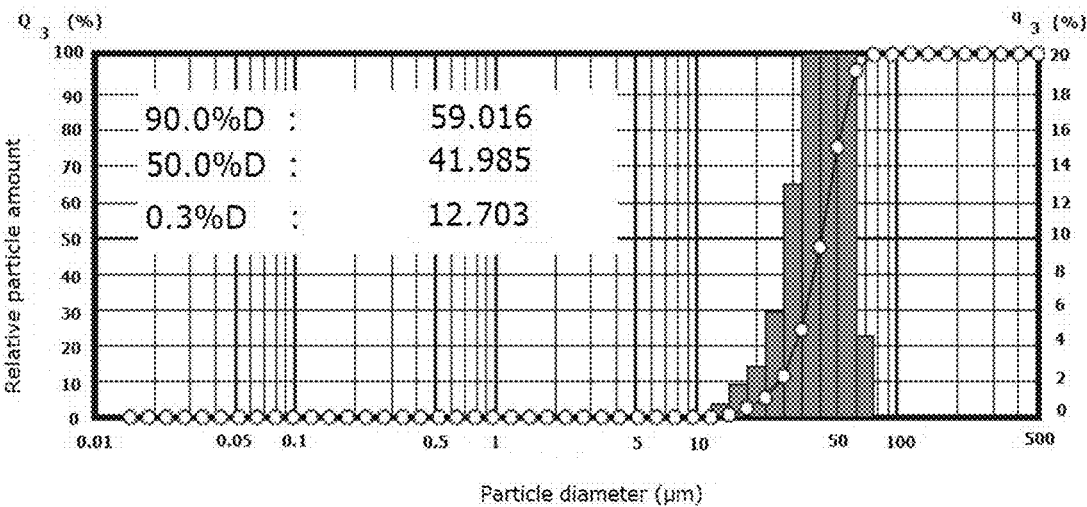

The classification results are shown in FIG. 10. FIG. 10 is a graph showing the particle size distribution of PLGA particles, (A) shows the particle size distribution of PLGA particle in an untreated processing fluid (that is, the processing fluid from the liquid supply source 157 to the processing liquid tank 155), (B) shows the particle size distribution of the PLGA particle in the processing fluid after the processing of Example B3 (that is, the processing fluid to be discharged to the processed material discharge destination 158 after the processing), and (C) shows the particle size distribution of the PLGA particle in the processing fluid after the processing of Example B6 (that is, the processing fluid to be discharged to the processed material discharge destination 158 after the processing). As is apparent from these graphs, in the processing fluids of Examples B3 and B6, it was confirmed that the particles having 15 μm or less are certainly classified (removed). When the processing fluid is passed through the outer ring-shaped flowpath, the centrifugal force for the particles having large particle size among the particles becomes larger than the centrifugal force for the particles having small particle size, the particles having large particle size are moved to the housing side and apart from the membrane element, thus, it becomes difficult to inhibit that the particles having small particle size pass through the membrane element.

As described above, in all the examples except Example B4 and Example B5, the maximum particle concentration exceeded that of Comparative Example B1. In addition, in all the examples except Example B2 and Example B5, the maximum classification speed exceeded that of Comparative Example B1. In Example B2 and Example B5, the maximum classification speed was lower than that of Comparative Example B1, but as shown in Table 3, the time until the filter (membrane element 113) was clogged exceeded that of Comparative Example B1.

From the above-mentioned contents, with fast/slow of the classification speed, high/low of the particle concentration of the secondary side discharged liquid and long/short elapsed time until clogging is generated, depending on the conditions of the processing or the purposes, it can be practiced by comprehensively judging quality of the classification efficiency.

EXPLANATION OF THE REFERENCE NUMERALS 11, 111 Filtration membrane module
12, 112 Housing
13, 113 Membrane element
14, 114 Primary side flowpath
15, 115 Filtration surface (filtration membrane)
16, 116 Secondary side flowpath
17, 18, 117 Flow adjuster
19 Support body
21 Static mixer
22 Elements
31, 41, 131 Spiral-shaped fins
32 Round bars or round tubes
51, 151 Primary side introduction port
52, 152 Primary side discharge port
53 Secondary side introduction port
54, 154 Secondary side discharge port
55, 155 Processing liquid tank
56, 156 Liquid feeding pump
57, 157 Liquid supply source
58, 158 Processed material discharge destination
59, 159 Filtrated liquid discharge destination
60, 160 Washing liquid supply source
61, 161 Return valve
62, 162 Filtration liquid valve
63, 163 Washing liquid valve
132, Small diameter portion
133, Large diameter portion
153, Stirring device

The invention claimed is:

1. A filtration membrane module to perform internal pressure crossflow filtration processing, comprising:
   a membrane element including a plurality of axially extending tubular flowpaths defining a primary side flowpath, each tubular flowpath including a hollow cylindrical filtration surface;
   a cylindrical housing disposed outside the membrane element and spaced from the membrane element;
   a secondary side flowpath between the membrane element and an inner peripheral surface of cylindrical housing; and
   a flow adjuster extending from the membrane element to the cylindrical housing so as to protrude into the secondary side flowpath, the flow adjuster being in the form of at least one spiral-shaped fin extending substantially an entire axial length of the secondary side to cause a spiral flow during backwashing,
   wherein, while allowing a pressurized processing fluid to pass through the tubular flowpaths, during the backwashing, a fluid for washing is configured to pass through the membrane element from an outer peripheral surface of the membrane element through the hollow cylindrical filtration surfaces and to the tubular flowpaths, wherein, during said backwashing, the flow adjuster is configured to change the flow of the fluid for washing passing through the secondary side flowpath without driving itself, and wherein by changing the flow of the fluid for washing passing through the secondary side flowpath with the flow adjuster, a wall surface fluid accelerating function which increases a flow velocity in a region along the outer peripheral surface of the membrane element in the secondary side flowpath of the fluid for washing is exhibited, as compared with a flow velocity in a region along the outer peripheral surface in the case where the flow adjuster is not arranged.

2. A filtration processing method, comprising:

providing the filtration membrane module according to claim 1; and performing crossflow filtration processing, with the filtration membrane module, to a processing fluid for the purpose of at least one or more of concentration, purification, solvent substitution, pH adjustment, conductivity adjustment, fine particle washing, fine particle surface treatment and classification of the processing fluid.

3. The filtration membrane module according to claim 1, wherein a filtration membrane constituting the filtration surface is selected from a ceramic membrane made of ceramic-based materials, a stainless membrane, a glass membrane, or an organic membrane, wherein the ceramic-based material is aluminum oxide, zirconium oxide, or titanium oxide, and the organic membrane is an organic membrane of polyethylene, tetrafluoroethylene, polypropylene, cellulose acetate, polyacrylonitrile, polyimide, or polyethersulfone.

4. The filtration membrane module according to claim 1, wherein the membrane element further comprises a porous support body, and wherein the plurality of axially extending tubular flowpaths are provided in the support body.

5. The filtration membrane module according to claim 1, wherein the at least one spiral-shaped fin of the flow adjuster includes a plurality of spiral-shaped fins extending over an entire length of the secondary side flowpath.

* * * * *